(12) United States Patent
Stemen et al.

(10) Patent No.: US 7,271,994 B2
(45) Date of Patent: Sep. 18, 2007

(54) ENERGY DENSE ELECTROLYTIC CAPACITOR

(75) Inventors: Eric Stemen, Roseville, MN (US);
Troy Lindke, Gasport, NY (US);
Edward Gloss, Clarence, NY (US);
Rodney Stringham, Corfu, NY (US);
Neal Nesselbeck, Lockport, NY (US);
Joseph Spaulding, Williamsville, NY (US); Barry Muffoletto, Alden, NY (US); Doug Eberhard, Grand Island, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 11/422,714

(22) Filed: Jun. 7, 2006

(65) Prior Publication Data
US 2006/0279906 A1    Dec. 14, 2006

Related U.S. Application Data (60) Provisional application No. 60/688,435, filed on Jun. 8, 2005.

(51) Int. Cl.
*H01G 9/04* (2006.01)
*H01G 9/145* (2006.01)
*H01G 2/10* (2006.01)

(52) U.S. Cl. ............ 361/508; 361/517; 29/25.03
(58) Field of Classification Search ........ 361/503, 361/508–509, 516–521; 29/25.03
See application file for complete search history.

(56) References Cited

U.S. PATENT DOCUMENTS

| 5,926,362 | A | 7/1999 | Muffoletto et al. |
| 6,212,063 | B1 * | 4/2001 | Johnson et al. ............ 361/517 |
| 6,801,424 | B1 | 10/2004 | Nielsen et al. |
| 7,012,799 | B2 | 3/2006 | Muffoletto et al. |
| 2005/0041374 | A1 | 2/2005 | Seitz et al. |

FOREIGN PATENT DOCUMENTS

EP     1 592 031 A1    11/2005

\* cited by examiner

*Primary Examiner*—Eric Thomas
(74) *Attorney, Agent, or Firm*—Michael F. Scalise (57) ABSTRACT

An electrical energy storage device such as a wet tantalum electrolytic capacitor or an electrochemical cell such as a lithium/silver vanadium oxide cell is described. The enclosure comprises a drawn casing portion having a planar face wall supporting a surrounding sidewall and is shaped to nest the anode, cathode and intermediate separator components. A mating cover is a stamped planar piece of similar material having a periphery edge welded to the edge of the casing portion surrounding sidewall. In order to prevent heat generated during the welding process from damaging the separator, the anode portion adjacent to the weld site is contoured. This provides sufficient space between the weld and the separator supported on the anode at the contour so that what heat is transmitted to the separator by convection and conduction mechanism will not damage the separator.

24 Claims, 10 Drawing Sheets

ENERGY DENSE ELECTROLYTIC CAPACITOR

CROSS-REFERENCE TO RELATED APPLICATION

The present application claims priority based upon U.S. provisional application Ser. No. 60/688,435, filed Jun. 8, 2005.

BACKGROUND OF THE INVENTION

The present invention generally relates to electrical energy storage devices. More particularly, the present invention describes a capacitor capable of powering an implantable medical device, such as a cardiac defibrillator.

SUMMARY OF THE INVENTION

A casing for an electrolytic capacitor, such as a wet tantalum capacitor, typically comprises mating clamshell portions. The clamshells are sealed at their overlapping sidewalls by a welding operation. The problem is that this generates heat that can be significant enough to damage the separator supported on the anode housed inside the casing. That is why added protection in the form of a metal weld strap and interior polymeric insulating ring are needed to shield the anode/separator from the weld heat. However, these parts occupy valuable interior space. Also, mating clamshells are themselves not as volumetrically efficient inside an implantable device as a casing of one drawn portion closed by a plate shaped cover or lid. The drawn casing portion has a planar face wall supporting a surrounding sidewall and nests the anode, cathode and intermediate separator components therein closed by the cover.

As is the case with the mating clamshells, with a drawn casing portion closed by a plated shaped lid, a portion of the anode pellet and enveloping separator is close enough to the weld site that without some form of additional protection, the separator can easily be damaged. The challenge then becomes how to protect the separator from heat damage during the closing welding operation without the need for a weld strap and insulating ring. The solution according to the present invention is to contour the edge portion of the anode that is immediately adjacent to the weld site only so much as needed to provide a sufficient gap distance to prevent conductive and convective mechanisms from transmitting sufficient heat to the separator to damage it. Various contoured anode constructions are described.

These and other aspects of the present invention will become more apparent to those skilled in the art by reference to the following description and to the appended drawings.

DETAILED DESCRIPTION OF THE PREFERRED EMBODIMENTS

Figure 1:
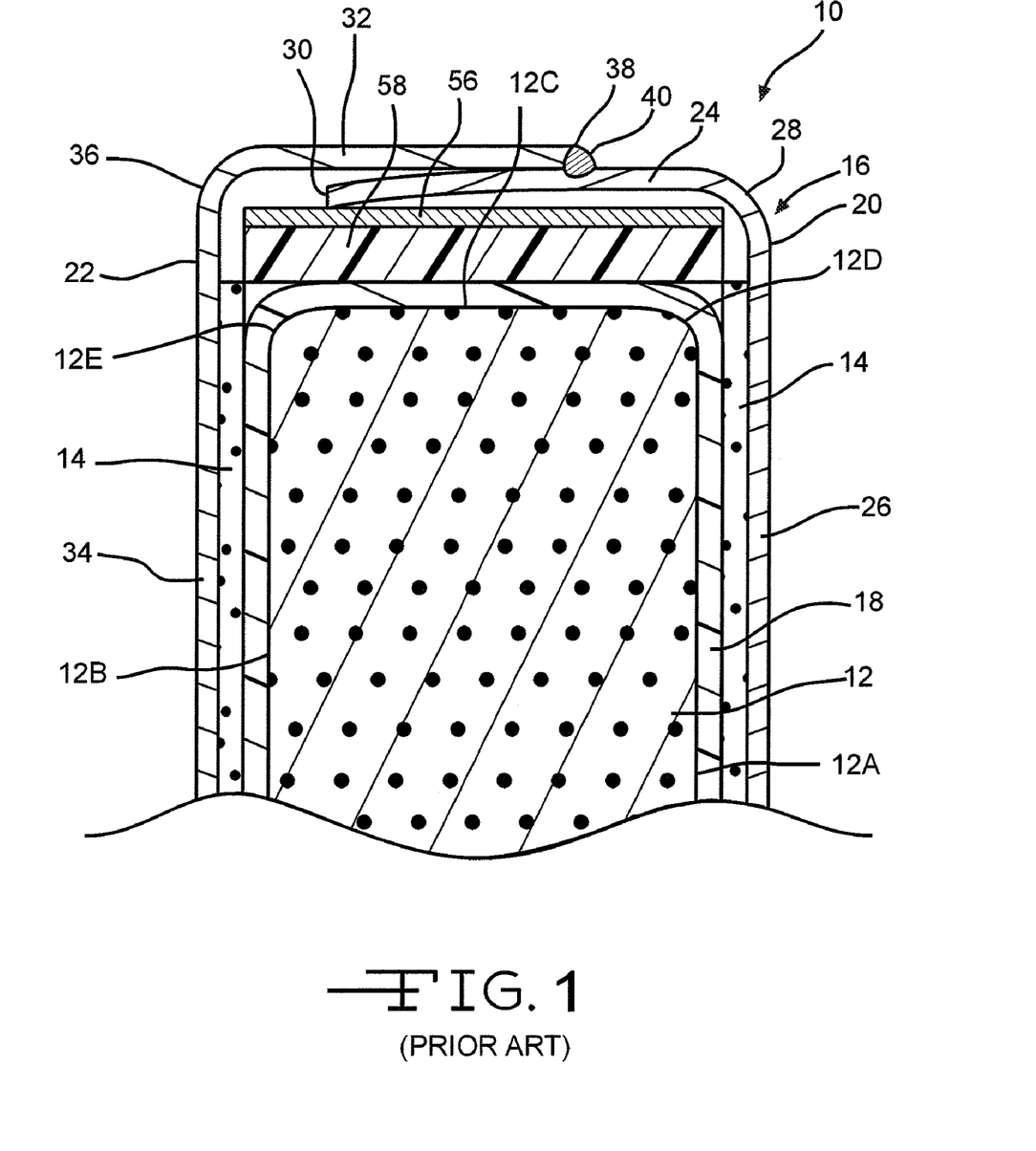
FIG. 1 is a cross-sectional view of a prior art capacitor 10.
Figure 2:
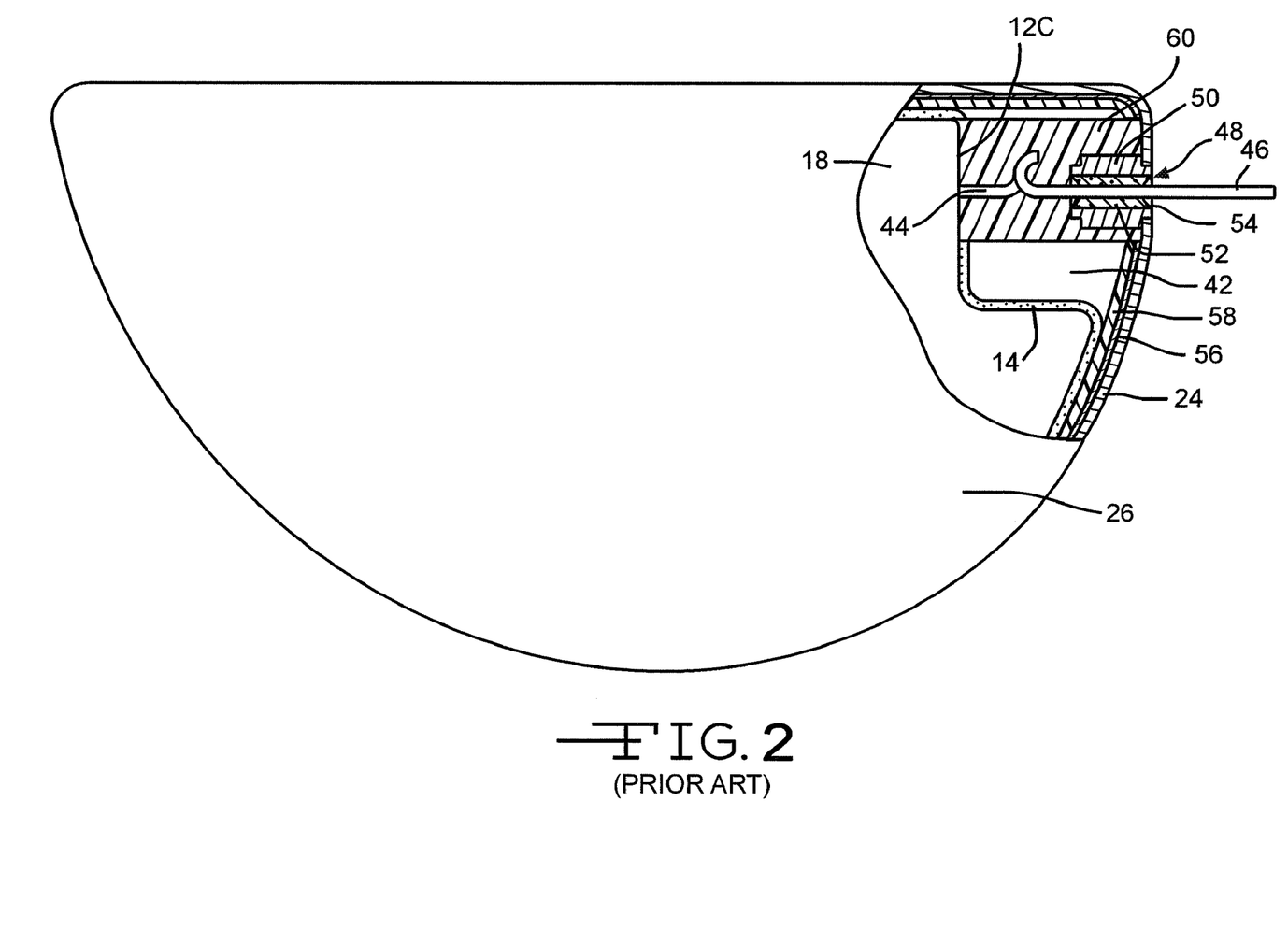
FIG. 2 is a side elevational view, partly broken away, of the capacitor 10 shown in FIG. 1.

Referring now to the drawings, FIGS. 1 and 2 show a capacitor 10 according to the prior art. The capacitor 10 comprises an anode 12 of an anode active material and a cathode 14 of a cathode active material housed inside a hermetically sealed casing enclosure 16. The capacitor electrodes are prevented from direct physical contact with each other by a separator structure 18 enveloping the anode 12. A working electrolyte (not shown) contained inside the enclosure contacts the anode and cathode. The capacitor 10 is of an electrolytic type with the cathode comprising a conductive material having capacitive properties.

The casing 16 is of a metal material comprising first and second drawn casing portions 20 and 22. The metal casing portions 20, 22 are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. In addition to being of a drawn form, the casing portions 20, 22 can be of a machined construction or be formed by a metal injection molding process. Preferably, the casing portions have a thickness of about 0.001 to about 0.015 inches.

Casing portion 20 comprises a surrounding sidewall 24 extending to and meeting with a face wall 26 at a curved intermediate bend 28. Opposite the bend 28, sidewall 24 extends to a continuous, perimeter edge 30. Similarly, casing portion 22 comprises a surrounding sidewall 32 extending to and meeting with a face wall 34 at a curved intermediate bend 36. Opposite the bend 36, sidewall 32 extends to a continuous perimeter edge 38. However, face wall 26 is somewhat smaller than face wall 34, so that its side wall 24 fits inside of sidewall 32 in an overlapping, contact relationship. Then, the casing is hermetically sealed by providing a weld 40 at edge 38 and sidewall 24.

The anode 12 is of an active metal that is typically selected from the group consisting of tantalum, aluminum, titanium, niobium, zirconium, hafnium, tungsten, molybdenum, vanadium, silicon, germanium, and mixtures thereof. As is well known by those skilled in the art, the anode metal in powdered form, for example tantalum powder, is compressed into a pellet of a desired shape. In the illustrated embodiment, the anode pellet is of a substantially uniform thickness between spaced apart right and left major side walls 12A, 12B joined by an end wall 12C. The major side walls 12A, 12B meet the intermediate wall 12C at respective curved edges 12D, 12E. The curved edges 12D, 12E are of a substantially similar radii as that of the casing bends 28, 36, respectively.

The cathode active material 14 preferably coats the face walls 26, 34 of the casing portions 20, 22 in a pattern that generally mirrors the shape of the anode 12. The cathode active material 14 has a thickness of about a few hundred Angstroms to about 0.1 millimeters and is either directly coated on the inner surfaces of the face walls 26, 34 or it is coated on a conductive substrate (not shown) supported on and in electrical contact with the inner surfaces thereof. Both cathode material coatings are preferably spaced from the sidewalls 24, 32 of the respective casing portions 20, 22.

In that respect, the face walls 26, 34 of the casing portions 20, 22 may be of an anodized-etched conductive material, have a sintered active material with or without oxide contacted thereto, be contacted with a double layer capacitive material, for example a finely divided carbonaceous material such as graphite or carbon or platinum black, a redox, pseudocapacitive or an under potential material, or be an electroactive conducting polymer such as polyaniline, polypyrole, polythiophene, polyacetylene, and mixtures thereof.

According to one preferred aspect of the present invention, the redox or cathode active material 14 includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 14 may also include a second or more metals. The second metal is in the form of an oxide, a nitride, a carbon nitride or carbide, and is not essential to the intended use of the conductive face walls 26, 34 as a capacitor cathode. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material 14 includes an oxide of ruthenium or oxides of ruthenium and tantalum.

A pad printing process as described in U.S. Patent Application Pub. No. 2005/0041374 is preferred for making such a coating. An ultrasonically generated aerosol as described in U.S. Pat. Nos. 5,894,403; 5,920,455; 6,224,985; and 6,468,605, all to Shah et al., is also a suitable deposition method. These are assigned to the assignee of the present invention and incorporated herein by reference.

As shown in FIG. 2, the anode 12 further comprises a notch 42 from which an embedded anode wire 44 extends. The anode wire 44 is preferably of the same material as the anode active material. The anode pellet is sintered under a vacuum at high temperatures and then anodized in a suitable electrolyte. The anodizing electrolyte fills the pores of the pressed powder body and a continuous dielectric oxide is formed thereon. In that manner, the anode 12 and extending wire 44 are provided with a dielectric oxide layer formed to a desired working voltage. Other preferred anode constructions include etched aluminum, pressed niobium powder, or titanium foil.

After the anode 12 and extending wire 44 are anodized to the desired formation voltage, the dielectric oxide is removed from the wire. The wire 44 is subsequently connected to an anode lead 46 supported in an insulative glass-to-metal seal 48 (GTMS). The glass-to-metal seal 48 comprises a ferrule 50 defining an internal cylindrical through bore or passage of constant inside diameter. An insulative glass 52 provides a hermetic seal between the ferrule bore and the anode lead 46 passing there through. The glass 52 is, for example, ELAN® type 88 or MANSOL™ type 88. The anode lead 46 has a J-shaped proximal portion that is connected to a crook (not shown) in the anode wire 44, which previously had the formed dielectric oxide removed. Laser welding secures the wire 44 and lead 46 together. The wire 44 and connected lead 46 are then re-anodized. Alternately, the anode wire 44 is a relatively straight member in line with and welded to a relatively straight anode lead 46.

The separator 18 is of electrically insulative material in the shape of a bag that completely surrounds and envelops the anode 12 except the extending wire 44. The separator 18 prevents an internal electrical short circuit between the anode 12 and cathode active materials 14 in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polytetrafluoroethylene, and polyethylenechlorotrifluoroethylene laminated or superposed with a polyolefinic or fluoropolymeric microporous film, non-woven glass, glass fiber materials and ceramic materials. Additional separator materials may include films of poly sulfone and polyester, for example, polyethylene terephthalate. Suitable microporous films include a polyethylene membrane commercially available under the designation SOLUPOR® (DMS Solutech), a polytetrafluoroethylene membrane commercially available under the designation ZITEX® (Chemplast Inc.) or EXCELLEPATOR® (W. L. Gore and Associates), a polypropylene membrane commercially available under the designation CELGARD® (Celanese Plastic Company, Inc.), and a membrane commercially available under the designation DEXIGLAS® (C. H. Dexter, Div., Dexter Corp.). Cellulose based separators are also useful. Depending on the electrolyte used, the separator 18 can be treated to improve its wettability, as is well known by those skilled in the art.

A preferred separator structure 18 comprises a non-woven layer of polyethylene or polypropylene, a microporous layer of polyethylene or polypropylene, and, possibly a third layer of polyethylene or polypropylene, which is also non-woven. The preferred separator 18 has a melting temperature of about 140° C. and must be protected from the heat generated when the edge 38 of casing portion 22 is secured to the sidewall 24 of casing portion 20 by weld 40. The other separator materials described above likewise have relatively low melting temperatures in comparison to the heat generated by the welding operation used to secure the casing portions 20, 22 together. This is even when the temperature is measured at the separator portion covering the anode end wall 12C.

After the cathode active material 14 is contacted to the face walls 26, 34 of casing portions 20, 22, the anode 12 enveloped in the separator 18 assembly is nested in the smaller casing portion 20 with a distal step of the GTMS 48 received in an opening 54 (FIG. 2) in the casing sidewall 24 in a tight fitting relationship. The ferrule 50 is then secured to the sidewall 24 such as by laser welding. In the final capacitor assembly, the GTMS 48 electrically insulates the anode lead 46 connected to the anode wire 44 from the metal casing 16.

As shown in FIGS. 1 and 2, a weld strap 56 is provided directly adjacent to the sidewall 24 of casing portion 20. The weld strap 56 is an annular, ring-shaped member surrounding the anode end wall 12C. The weld strap 56 is typically of the same metal material as that of the casing portions 20, 22. An intermediate polymeric insulating ring 58 seats against the weld strap 56 and the separator 18 portion covering the anode end wall 12C. The weld strap 56 in conjunction with the insulating ring 58 help shield the separator at the anode end wall 12C from the heat generated as the casing portions 20, 22 are welded together. A polymeric material 60 encases the GTMS 48 including the anode wire 44 connected to the lead 46. This helps stabilize these components from movement should the capacitor ever be subjected to rough handling, and the like.

A working electrolyte (not shown) is then provided in the capacitor through an opening in one of the casing portions 20, 22. The electrolyte thoroughly wets the anode 12 including the enveloping separator 18 and the cathode active materials 14 to provide the capacitor 10 in a functional state. A suitable working electrolyte for the capacitor 10 is described in U.S. Pat. No. 6,219,222 to Shah et al., which includes a mixed solvent of water and ethylene glycol having an ammonium salt dissolved therein. U.S. Pub. Nos. 2003/0090857 and 2003/0142464 describe other working electrolytes for the present capacitors. The working electrolyte of the former publication comprises water, a water-soluble inorganic and/or organic acid and/or salt, and a water-soluble nitro-aromatic compound while the latter relates to an electrolyte having de-ionized water, an organic solvent, isobutyric acid and a concentrated ammonium salt. These are assigned to the assignee of the present invention and incorporated herein by reference. A closure member (not shown) is hermetically welded in the electrolyte fill opening to seal the casing 16 closed.

The casing enclosure 16, including the portions 20, 22, being of a conductive metal serves as the negative terminal for making electrical connection between the capacitor 10 and its load. A pin (not shown) is welded to one of the casing portions 20, 22 to provide this. The anode lead 46 extending outside the casing 16 is hermetically sealed from the interior of the capacitor and insulated from the enclosure 16 by the GTMS 48 to serve as the positive terminal for the capacitor 10.

In the prior art capacitor 10, the weld strap 56 and insulating ring 58 occupy valuable space inside the casing 16. By redesigning the anode and the casing according to the present invention, however, these components can be eliminated without compromising the structural integrity of the separator 18 during a welding operation for securing casing portions together for a sealed enclosure.

Figure 3:
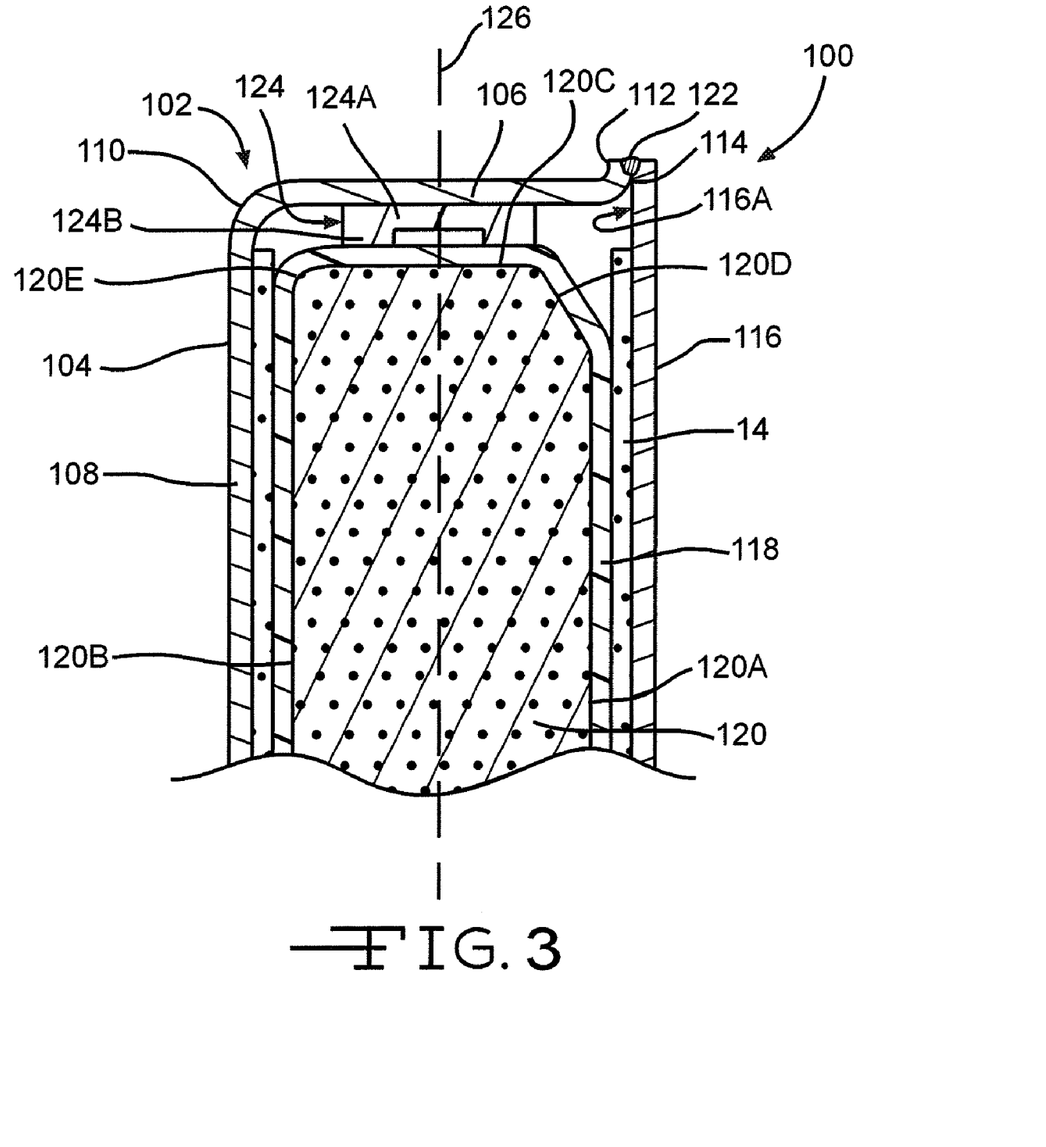
FIG. 3 is an isometric view of a capacitor 100 according to the present invention.
Figure 3A:
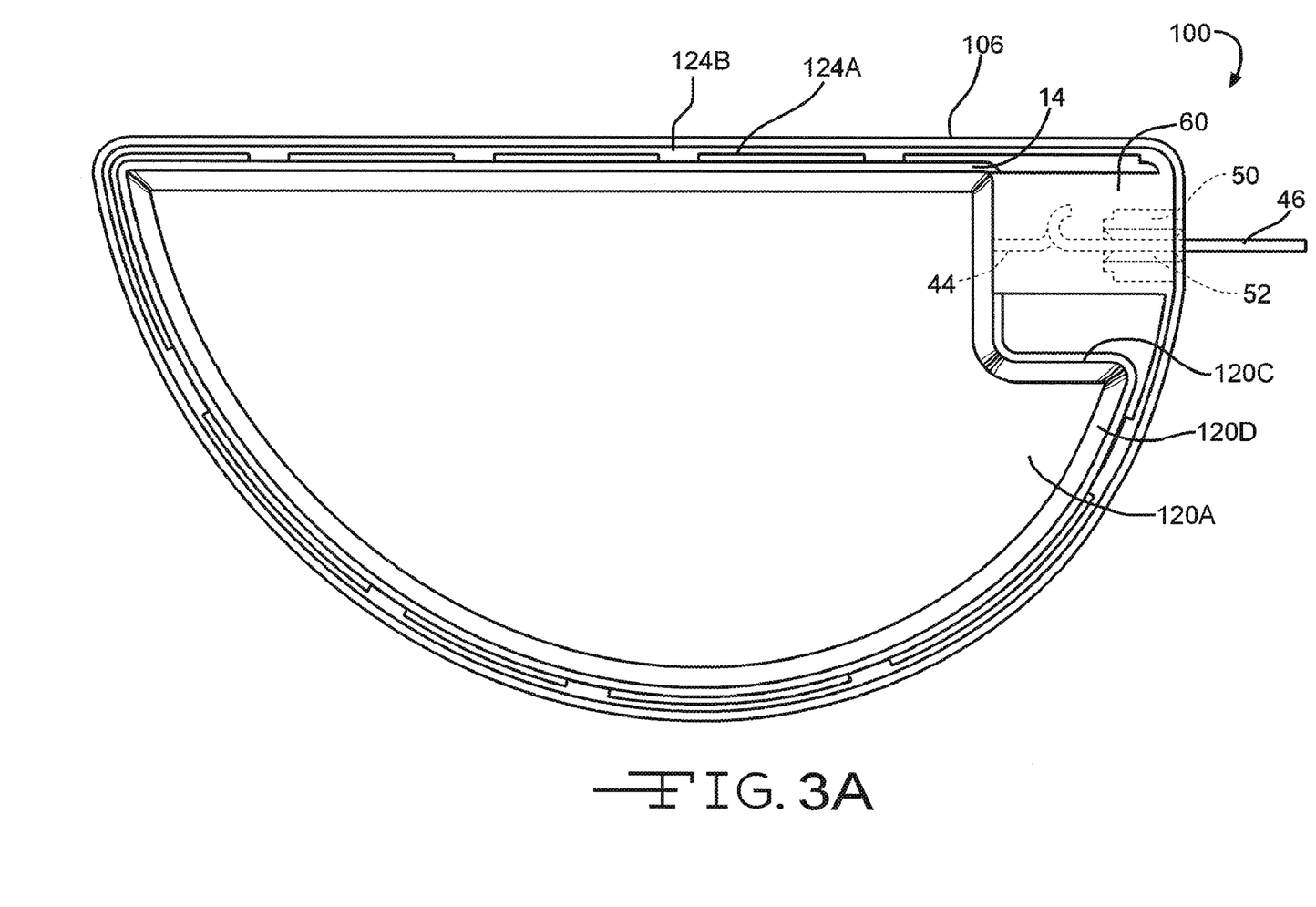
FIG. 3A is a plan view of the capacitor 100 shown in FIG. 3 looking from the cover, which is removed.

FIG. 3 shows one embodiment of a capacitor 100 according to the present invention. The capacitor 100 comprises similar materials of construction as the prior art capacitor 10, which are indicated by like numerical designations. The main difference is in the shape or structure of the anode pellet and the casing components. In that respect, the casing 102 comprises a drawn casing portion 104 having a surrounding sidewall 106 extending to and meeting with a face wall 108 at a curved intermediate bend 110. Opposite the bend 110, sidewall 106 extends to a continuous, outwardly turned lip 112 forming a perimeter edge 114 at an opening of the casing portion 104. Preferably, the lip 112 extends about 0.003 inches past the outer surface of the sidewall 106.

A casing cover 116 in the form of a plate is shaped to close the opening of the casing portion 104 with its inner surface 116A resting against the perimeter edge 114. In this position, the cathode active material 14 on the inner surface 116A of the casing cover 116 contacts the separator 118 enveloping the anode 120 immediately adjacent to a major anode face wall 120A. The opposite anode face wall 120B contacts the separator 118 immediately adjacent to the cathode active material 14 supported on the face wall 108 of the casing portion 104. A weld 122 is then provided about the entire perimeter of the casing cover 116 where its inner surface 116A contacts the perimeter edge 114 of the casing portion 104. This hermetically secures the casing portions 104, 116 together. The weld is preferably provided by a laser. While not shown in the drawing which is exaggerated for illustration purposes, the welding operation melts the lip 112 and corresponding edge of the cover 116 to provide the casing with a welded edge substantially coplanar with the outer surface of the sidewall 106.

With the separator 118/anode 120 assembly nested in the casing portion 104 and before the casing cover 116 is secured thereto, a polymeric cradle 124 is molded in a surrounding relationship about the separator 118 enveloping the anode 120 at its end wall 120C between the major anode face walls 120A, 120B. The polymeric cradle 124 comprises a web 124A contacting the inner surface of the casing sidewall 106 and supporting a plurality of spaced apart protrusions 124B contacting the separator 118 at spaced locations along the perimeter of the anode end wall 120C. In a similar manner as shown in FIG. 2, a portion of the polymeric protrusion material encases the GTMS 48 including the anode wire 44 connected to the lead 46. The polymeric cradle 124 helps stabilize these components from movement should the capacitor ever be subjected to rough handling, and the like. Suitable polymeric materials include a polyolefin, a fluoropolymer, a hot melt adhesive, or a UV curable adhesive. A relatively slow curing silastic material is also useful. For a detailed description of how the polymeric cradle 124 is manufactured around the separator 118 enveloping the anode 120 and the GTMS 48 connected to the anode wire 44, reference is made to U.S. Application Pub. No. 2005/0190530, which is assigned to the assignee of the present invention and incorporated herein by reference.

Then, with the anode 120 nested in the casing portion 104 held in position by the polymeric cradle 124, the casing plate 116 is secured thereto by weld 122, as previously described. When this is done, the distance from the casing lip 112 to the right anode edge 120D intermediate the face wall 120A and end wall 120C is greater in comparison to the distance from the inner surface of the curved casing bend 110 to the curved left edge 120E of the anode pellet 120. The curved left edge 120E has a substantially similar radius as that of the casing bend 110. The relatively closed distance between the left edge 120E and casing bend 110 is not a problem at an interior location in a drawn casing, and the like. The reason is that even when the weld strap and insulating ring have been eliminated for volumetric efficiency considerations, the welding location for securing two casing portions together, regardless whether they are both of a drawn construction or of one drawn part and a closing plate, is sufficiently distant that heat will not damage the separator there or at the end wall 120C. However, immediately adjacent to a weld location the structural integrity of the separator 118 can easily be damaged in a capacitor. Instead, the right edge 120D portion of the anode pellet immediately adjacent to the weld 122 is contoured to increase the distance to the separator 118 from the weld 122 so that the amount of heat transmitted thereto by both convection and conduction mechanisms along the casing will not damage the separator.

In FIG. 3, the contoured edge 120D is a planar surface joining with the planar right face wall 120A and planar end wall 120C at respective obtuse angles. Except at the contoured edge 120D, the anode pellet 120 is substantially symmetric along an imaginary plane 126 bisecting the width of the pellet. The distance from the right contoured edge 120D to the imaginary plane 126, however, is less than the distance from the curved left edge 120E to the plane 126. This means that the anode face wall 120A is of a lesser area than that of the anode face wall 120B. The increased distance from the contoured edge 120D to the weld 122 is sufficient to ensure that when the weld 122 is formed, there is enough mass in the casing sidewall 106 and cover 116 and enough void or air space between the sidewall 106 and the separator 118 at the edge 120D so that the heat transmitted to the separator by conduction and convection mechanisms is not sufficient to melt or otherwise damage the separator.

In all other respects, the thusly constructed capacitor 100 is similar to the prior art capacitor 10. This includes being provided with respective terminals for the anode and cathode and having a working electrolyte hermetically sealed therein. The other capacitor embodiments that are described in FIGS. 4 to 12 are constructed in a similar manner in that respect.

Figure 4:
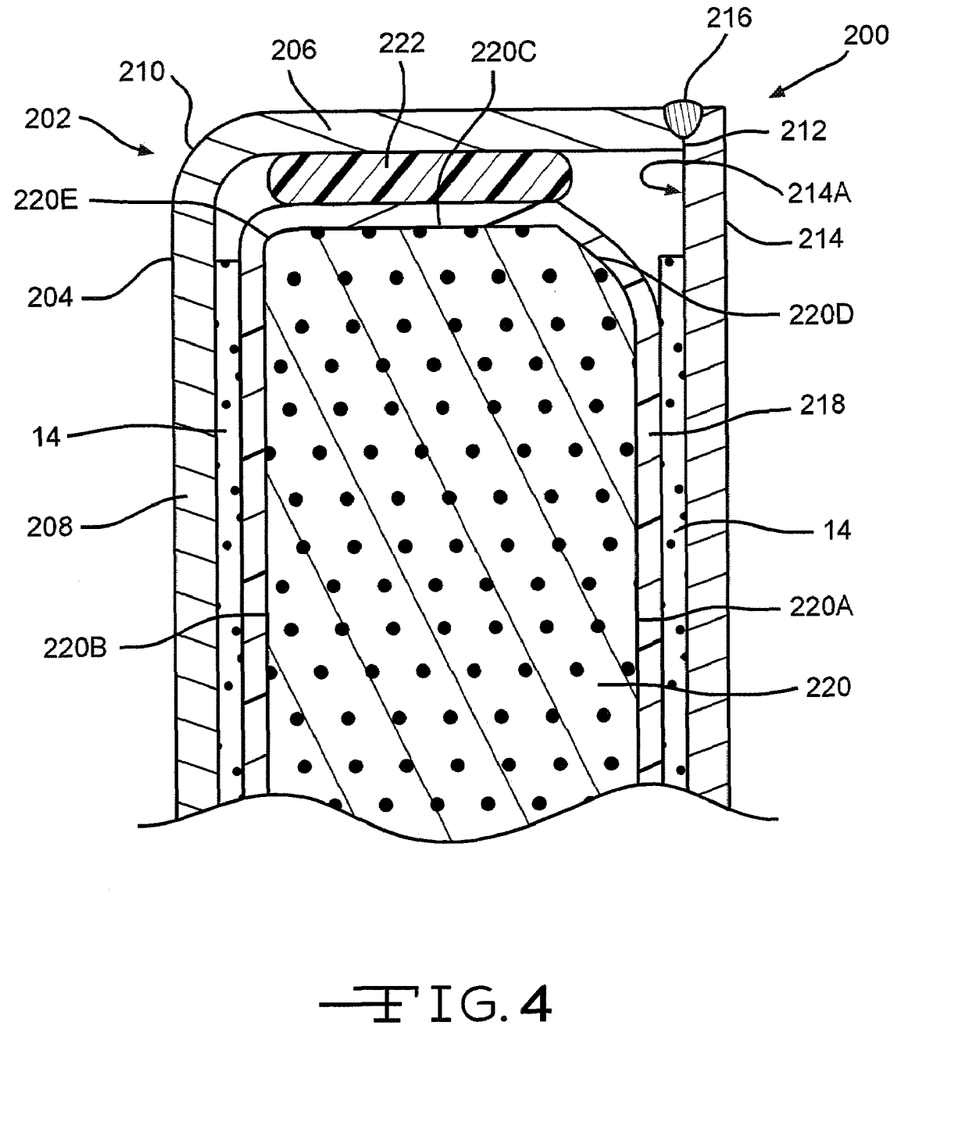
FIGS. 4 to 12 are isometric views of various other capacitor embodiments according to the present invention.

FIG. 4 shows another embodiment of a capacitor 200 according to the present invention. The capacitor 200 includes a casing 202 comprised of a drawn casing portion 204 having a surrounding sidewall 206 extending to a face wall 208 at a curved intermediate bend 210. Opposite the bend 210, the sidewall 206 extends to a continuous perimeter edge 212 surrounding an opening of the casing portion 204. A plate-shaped casing cover 214 is sized to close the opening of the casing portion 204 when it is secured thereto by weld 216. Cathode material 14 supported on the inner surface 214A of the casing cover 214 contacts the separator 218 enveloping the anode 220 immediately adjacent to a major anode face wall 220A. The opposite anode face wall 220B contacts the separator 218 immediately adjacent to the cathode active material 14 supported in the face wall 208 of the casing portion 204.

With the separator 218/anode 220 assembly nested in the casing portion 204 and before the casing cover 214 is secured thereto, a polymeric restraint 222 is provided as a "point contact" structure that extends a relatively short distance about the periphery of the anode pellet 220. In practice, there may be several restraint structures about the periphery of the anode pellet 220. While the restraint 222 is shown having an oval shape, that is not limiting. What is important is that the polymeric restraint extends to and contacts the inner surface of the casing sidewall 206 at the separator 218 covering the anode end wall 220C. This provides mechanical stabilization of the anode pellet 220 inside the casing 202 should the capacitor be subjected to rough handling, and the like. The polymer restraint 222 is of similar materials as the previously described polymeric cradle 124. For a more detailed description of a polymeric restraint for an electrical energy storage device, reference is made to U.S. application Ser. No. 11/222,259, which is assigned to the assignee of the present invention and incorporated herein by reference.

In a similar manner as previously described with respect to the present invention capacitor 200 shown in FIG. 3, the anode pellet 220 includes a contoured right edge 220D intermediate the face wall 220A and end wall 220C. The contoured edge 220D is a greater distance from the union of the casing edge 212 and plate-shaped cover 214 at weld 216 than the curved left edge 220E is from the casing bend 210. The contoured edge 220D is substantially planar where it meets the end wall 220C, but curved where it meets the face wall 220A. Nonetheless, the distance from the contoured edge 220D is sufficient to ensure that when the weld 216 is formed there is enough mass in the casing sidewall 206 and cover 214 and enough void space to the separator 218 to ensure that what heat is transmitted to the separator 218 by conductive and convection mechanisms is not sufficient to melt or otherwise damage the separator.

The polymeric cradle 124 shown in FIG. 3 can be replaced with the polymeric restraint 222. Likewise, the polymeric restraint 222 can be replaced with the polymeric cradle 124.

Figure 5:
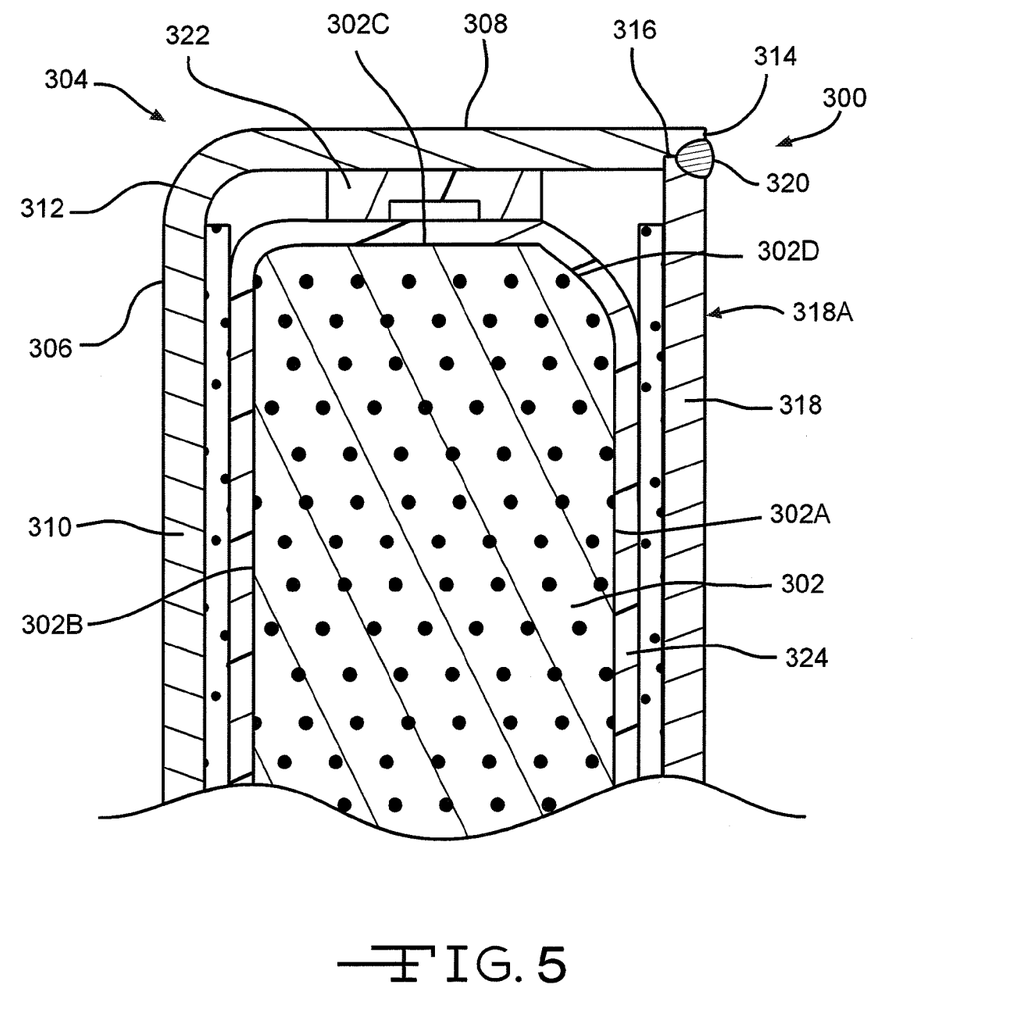

FIG. 5 illustrates another embodiment of a capacitor 300 according to the present invention. The capacitor 300 comprises an anode pellet 302 having a similar shape as the pellet 220 described in FIG. 4. The casing 304 comprises a drawn casing portion 306 having a surrounding sidewall 308 extending to a face wall 310 at a curved intermediate bend 312. Opposite the bend, the sidewall 308 extends to a continuous perimeter edge 314 surrounding an opening of the casing portion 306. The edge 314 is provided with an inner step 316 that receives a plate-shaped cover 318 for closing the opening of the casing portion 306 when it is secured thereto by weld 320. The step 316 is sized so that the outer surface 318A of plate 318 is coplanar with the edge 314 to provide the casing 304 having a flat back shape. This is useful for housing the capacitor in a confined area such as when it is used as a power source for an implantable medical device, for example a cardiac defibrillator, drug pump, neurostimulator, and the like.

The anode pellet 302 is restrained in place by a polymer cradle 322 and comprises opposed face walls 302A, 302B extending to an intermediate end wall 302C. A contoured edge 302D similar to contoured edge 220D of capacitor 200 is provided intermediate the face wall 302A and end wall 302C and adjacent to the weld 320. Again the contoured edge 302D provides a sufficient distance from the weld 320 to the separator 324 so that the separator is not damaged during the welding operation.

Figure 6:
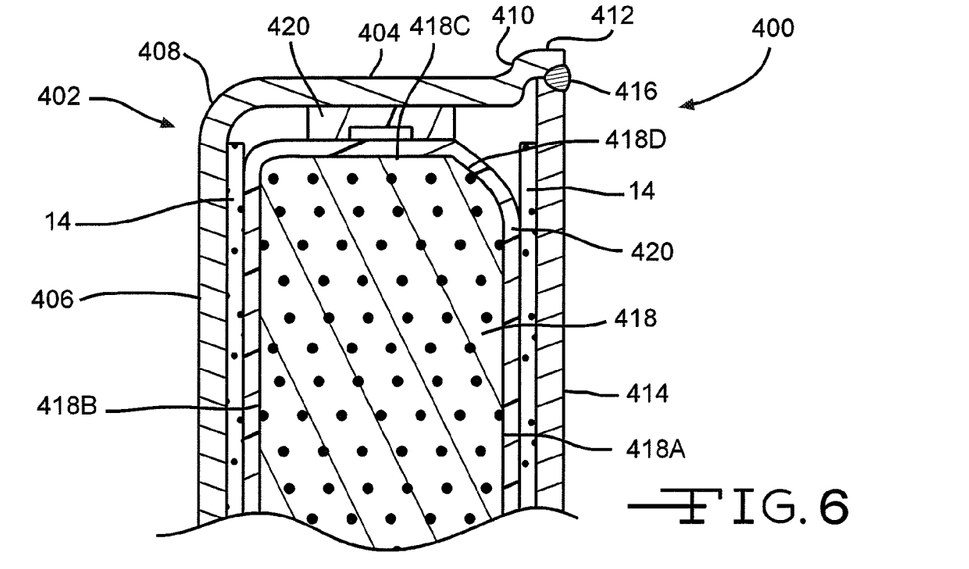

FIG. 6 illustrates another embodiment of a present invention capacitor 400 including a casing 402 comprising a sidewall 404 extending to a face wall 406 at a curved intermediate bend 408. Opposite the bend 408, sidewall 404 forms into an upstanding surrounding web 410 extending to a rim 412. The web 410 and extending rim 412 are continuous about the perimeter of the sidewall 404. That way, they form a recess precisely sized to receive a planar, plate shaped casing cover 414 when it is secured therein by weld 416 to provide the casing 402 having a flat back shape.

The anode pellet 418 is restrained in place by a polymeric cradle 420 and comprises opposed face walls 418A, 418B extending to an intermediate end wall 418C. A contoured edge 418D similar to the contoured edges 220D and 302D of respective capacitors 200, 300 is provided intermediate the face wall 418A and end wall 418C and adjacent to the weld 416. Again, the contoured edge 418D provides a sufficient distance from the weld 416 to the separator 420 so that the separator is not damaged during the welding operation.

Figure 7:
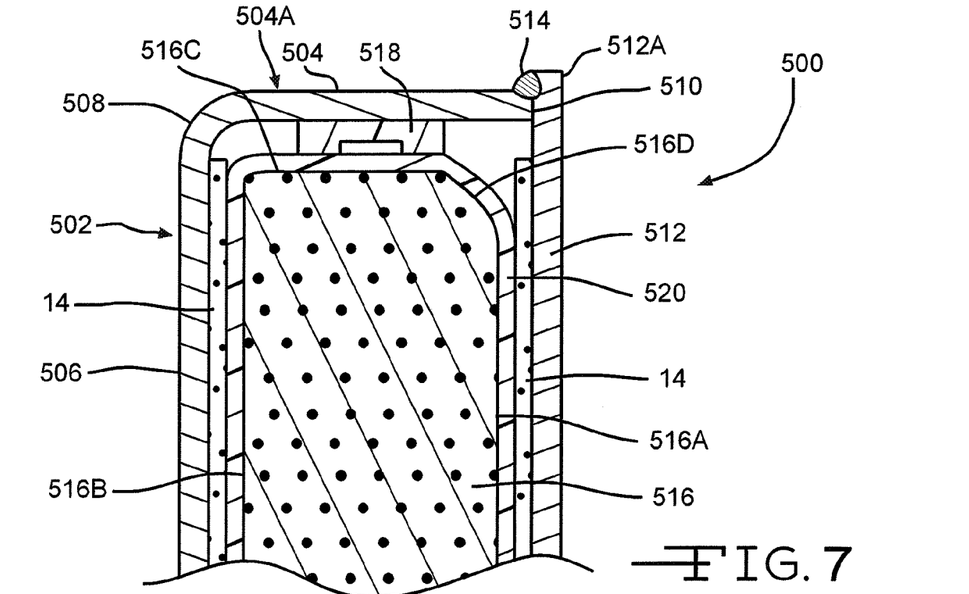

FIG. 7 illustrates another embodiment of a present invention capacitor 500 including a casing 502 comprising a sidewall 504 extending to a face wall 506 at a curved intermediate bend 508. Opposite the bend 508, sidewall 504 extends to a planar edge 510. A planar, plate shaped casing cover 512 rests on the edge 510. An edge portion 512A of the cover extends beyond the outer surface 504A of the sidewall. A weld 514 secures the cover to the sidewall 504.

The anode pellet 516 is restrained in place by a polymeric cradle 518 and comprises opposed face walls 516A, 516B extending to an intermediate end wall 516C. A contoured edge 516D similar to the previously described contoured edges 220D, 302D and 418D of respective capacitors 200, 300 and 400 is provided intermediate the face wall 516A and end wall 516C and adjacent to the weld 514. Again, the contoured edge 516D provides a sufficient distance from the weld 514 to the separator 520 so that the separator is not damaged during the welding operation.

Figure 8:
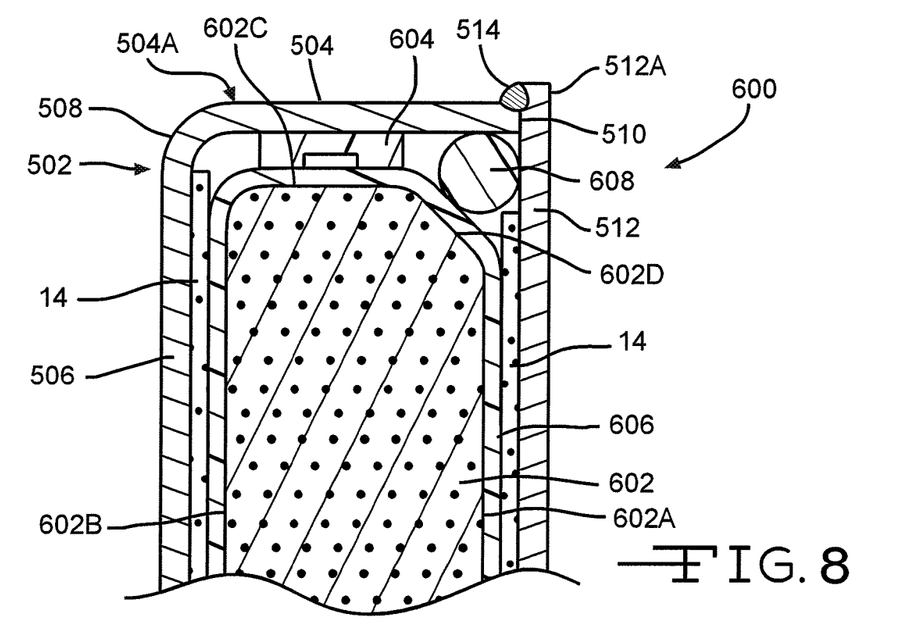

FIG. 8 illustrates another embodiment of a present invention capacitor 600 including the casing 502 illustrated and described with respect to FIG. 7. The anode pellet 602 is restrained in place by a polymeric cradle 604 and comprises opposed face walls 602A, 602B extending to an intermediate end wall 602C. A contoured edge 602D similar to the previously described contoured edge 120D of capacitor 100 is provided intermediate the face wall 602A and end wall 602C and adjacent to the weld 514. The contoured edge 602D provides a sufficient distance from the weld 514 to the separator 606 so that the separator is not damaged during the welding operation. To provide additional protection for the separator 606, a polymeric O-ring 608 is snuggly fit between the separator 606 at the junction of the sidewall 504 and the cover 512. The O-ring has a circular cross-section and helps shield the separator from heat created during formation of the weld 514. Suitable materials for the polymeric O-ring 608 include polyimides, silicone, and fluoropolymers such as polytetrafluoroethylene (PTFE), tetrafluoroethylene (TFE), and polytrifluoroethylene.

One structure of note is that the cathode active material 14 supported on the casing sidewall 506 extends up to and somewhat past the end wall 602C. However, the cathode active material 14 is only provided on the cover 512 up to the O-ring 608. There is no need to have cathode active material any further on the cover because it is not opposed by anode material. In all of the previous embodiments, the cathode active material extends up the casing sidewall and cover to the opposite anode ends.

Figure 9:
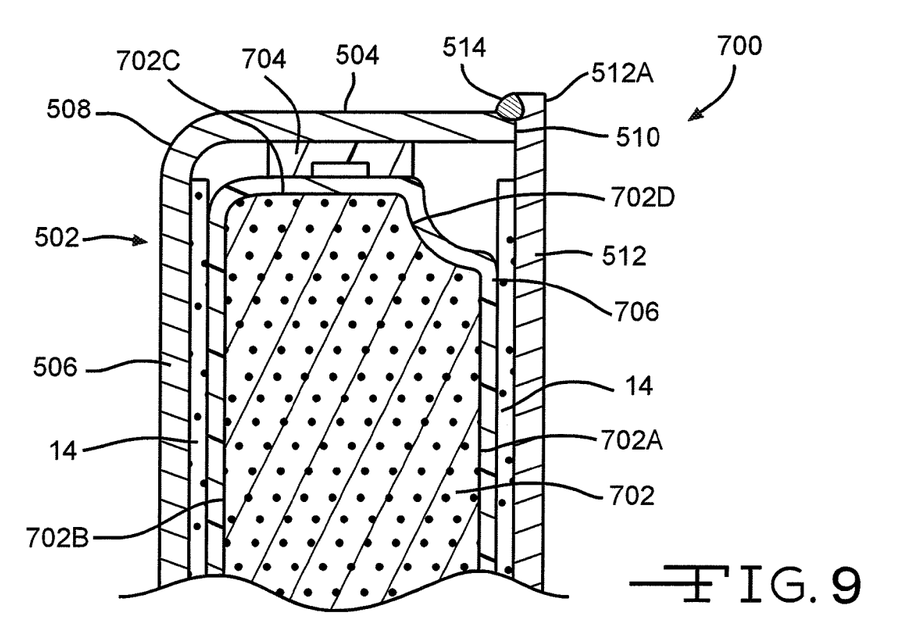

FIG. 9 illustrates another embodiment of a present invention capacitor 700 including the casing 502 illustrated and described with respect to FIG. 7. The anode pellet 702 is restrained in place by a polymeric cradle 704 and comprises opposed face walls 702A, 702B extending to an intermediate end wall 702C. A contoured edge 702D having a concave shape faces the junction of the sidewall 504 and cover 512 adjacent to the weld 514. The contoured edge 702D provides an increased distance from the weld 514 to the separator 706 in comparison to the edges 120D and 220 of the respective capacitors 100, 200. This further helps prevent the separator from being damaged during the welding operation.

Figure 10:
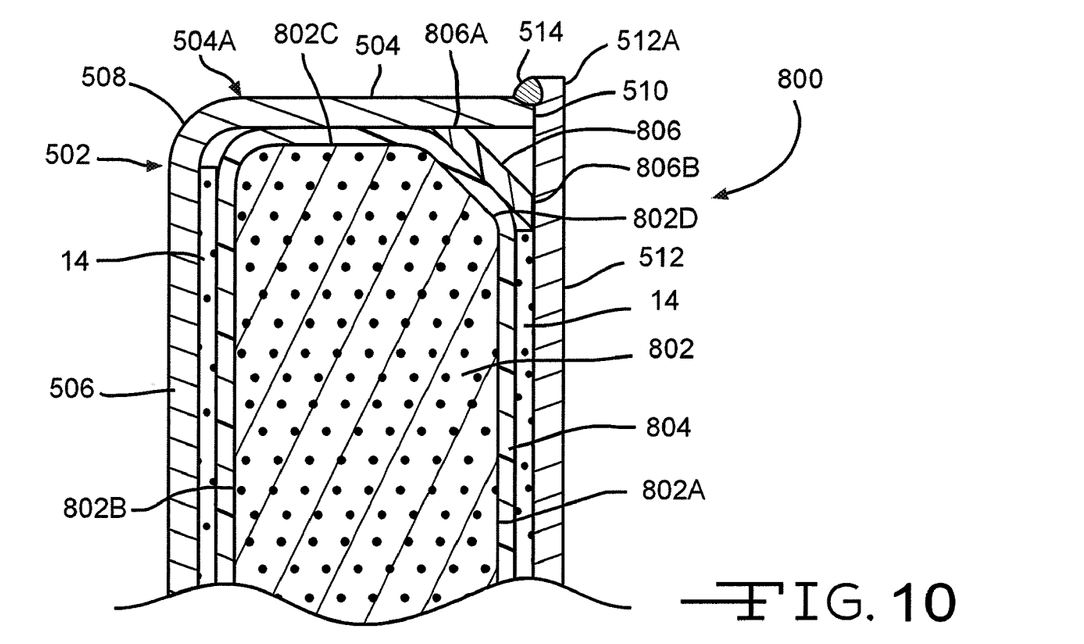

FIG. 10 illustrates another embodiment of a present invention capacitor 800 including the casing 502 illustrated and described with respect to FIG. 7. The anode pellet 802 comprises opposed face walls 802A, 802B extending to an intermediate end wall 802C. Instead of being restrained in place by a polymeric cradle, however, the anode pellet is sized so that its end wall 802C and covering separator 804 fit snuggly up against the casing sidewall 504. A contoured edge 802D similar to the previously described planar contoured edge 120D of capacitor 100 is provide between the face wall 802A and end wall 802C and adjacent to the weld 514. The contoured edge 802D provides a sufficient distance from the weld 514 to the separator 804 so that the separator is not damaged during the welding operation. Since a polymeric cradle is not provided, which serves to stand the anode end wall 802C off from the sidewall 504, a polymeric O-ring 806 is snuggly fit against the separator 804 at the junction of the sidewall 504 and the cover 512. The O-ring 806 is in the shape of a web having a rectangular cross-section with opposed ends 806A and 806B that are angled to precisely fit against the sidewall 504 and cover 512, respectively. That way, the web 806 completely blocks any convective communication between the weld 514 and the contoured edge 802D to provide additional protection for the separator 804.

Figure 11:
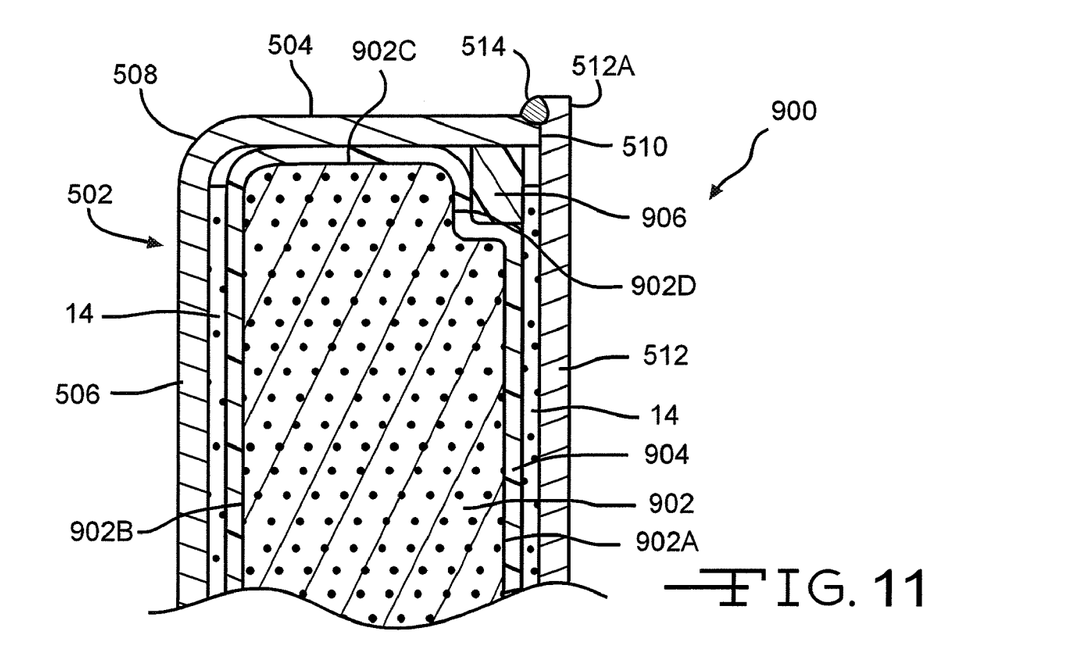

FIG. 11 illustrates another embodiment of a present invention capacitor 900 including the casing 502 illustrated and described with respect to FIG. 7. The anode pellet 902 comprises opposed face walls 902A, 902B extending to an intermediate end wall 902C. The anode pellet 902 is sized so that its end wall 902C and covering separator 904 fit snuggly up against the casing sidewall 504. A contoured edge 902D having an inwardly extending step shape faces the junction of the sidewall 504 and cover 512 adjacent to the weld 514. The contoured edge 902D provides an increased distance from the weld 514 to the separator 904 in comparison to the edges 120D and 220D of the respective capacitors 100, 200. This further helps prevent the separator from being damaged during the welding operation. Since a polymeric cradle is not provided, which serves to stand the anode end off from the sidewall 504, a polymeric O-ring 906 having a rectangular cross section snuggly fits against the separator 904 at the junction of the sidewall 504 and the cover 512 adjacent to the weld 514. That way, the web 906 completely blocks any convection communication between the weld 514 and the contoured edge 906D to provide additional protection for the separator 904.

It should be noted that the embodiments of the present anode constructions shown in FIGS. 8 to 11 can also be housed in anyone of the casings shown in FIGS. 3 to 7. Likewise, the anode embodiments shown in FIGS. 3 to 7 can be housed in the casings described in FIGS. 8 to 11.

Figure 12:
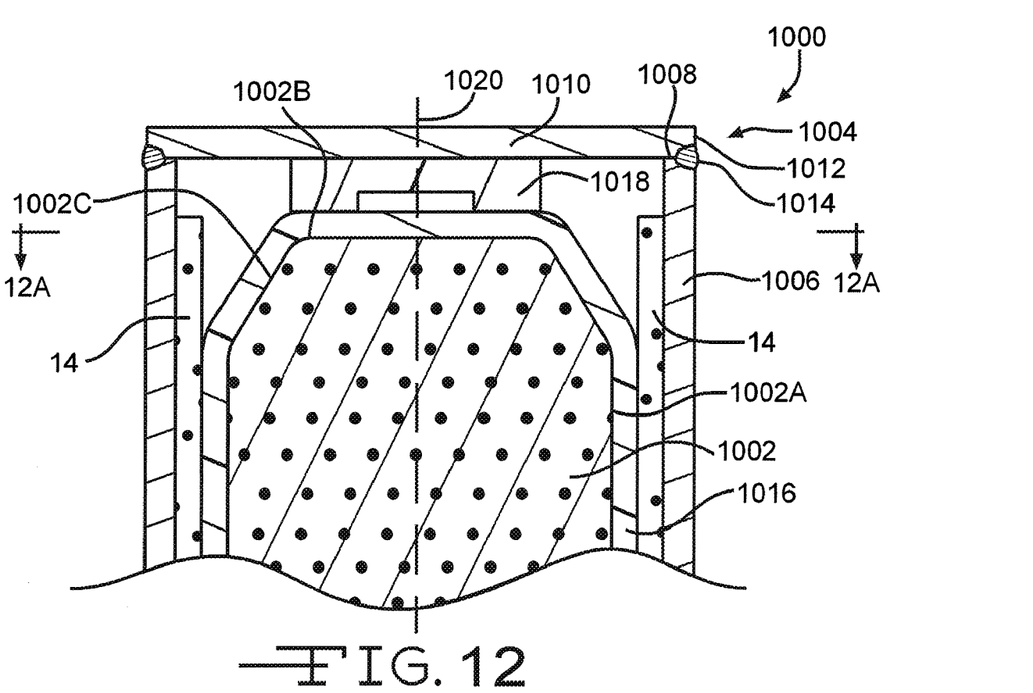
Figure 12A:
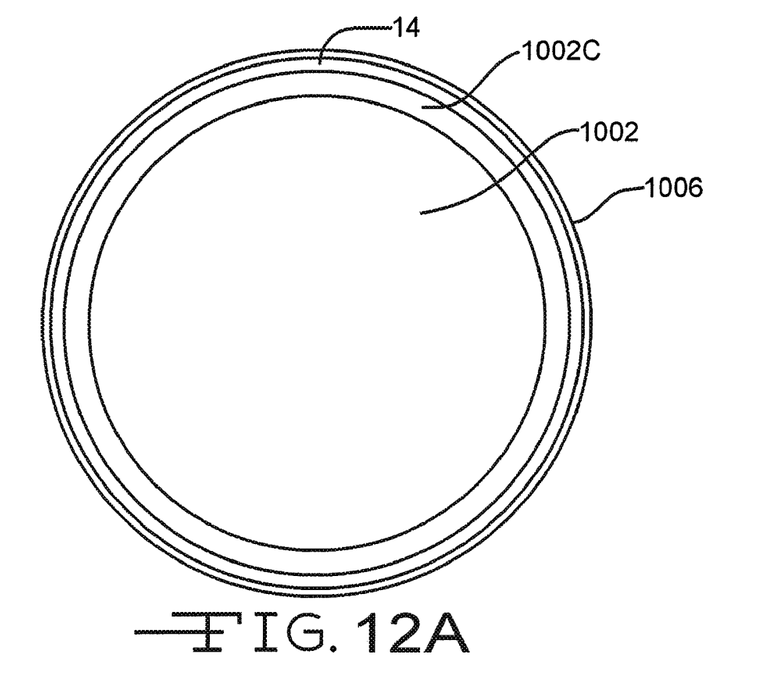
FIG. 12A is a cross-sectional view along line 12A-12A of FIG. 12.

FIGS. 12 and 12A illustrate another embodiment of a capacitor 1000 according to the present invention. The capacitor 1000 comprises a cylindrically shaped anode pellet 1002 housed inside a cylindrical casing enclosure 1004. The casing 1004 comprises a casing portion having a cylindrical sidewall 1006 extending from a bottom wall (not shown) to an annular upper edge 1008. A disc-shaped, planar cover or lid 1010 is supported on the upper edge 1008. The cover 1010 has a peripheral edge 1012 that is coplanar with the outer surface of the casing sidewall 1006. The cover 1010 is secured to the casing portion by a weld 1014 provided at the cover edge 1012 and upper edge 1008 of the sidewall 1006.

The anode pellet 1002 has an annular sidewall 1002A extending from a lower end (not shown) to an upper end 1002B. An inwardly contoured edge 1002C is provided intermediate the anode sidewall 1002A and end wall 1002B adjacent to the weld 1014. The anode 1002 is enveloped by a separator 1016. A cathode active material 14 contacts the inner surface of the casing sidewall 1006 to a height substantially in line with the end wall 1002B of the anode pellet. A polymeric cradle 1018 restrains the anode 1002 in place against rough handling, and the like.

In a similar manner as the previously described capacitor embodiments of the present invention, the separator covering the anode contoured edge 1002C is closer to a longitudinal axis 1020 of the anode pellet in comparison to the anode sidewall 1002A. This provides sufficient space and distance between the contoured edge 1002C and weld 1014 to ensure that when the weld is formed there is enough mass in the casing sidewall 1006 and cover 1010 and enough void space to the separator 1016 to ensure that what heat is transmitted to the separator by conductive and convective mechanisms is not sufficient to melt or otherwise damage the separator.

While not shown in the drawing FIGS. 12 and 12A, anode 1002 is provided with a lead that serves as its terminal electrically insulated from the casing serving as the terminal for the cathode. A working electrolyte is also provided in the casing 1004 in contact with the anode and cathode.

The present invention has been described with respect to a capacitor. However, that should not be viewed as limiting its scope. Those skilled in the art after having read the present description will readily understand that the various enclosure structures are equally applicable for use with an electrochemical cell. In respect to the embodiment shown in FIG. 3, the cathode is typically disposed in an intermediate position between anode active material in electrical contact with the inner surfaces of the face wall 108 and the inner surface of the casing cover 116. For example, in a lithium/silver vanadium oxide cell, lithium is in electrical contact with the face wall 108 and cover 116 while silver vanadium oxide is disposed in an intermediate position, segregated from the lithium anode by a separator material. This is a typical case-negative cell design, as shown in U.S. Pat. No. 5,250,373 to Muffoletto et al., which is assigned to the assignee of the present invention and incorporated herein by reference. In a case positive design, silver vanadium oxide is in electrical contact with the face wall 108 and cover 116 and lithium is in the center position. A commonly used electrolyte for a Li/SVO cell is 0.8 to 1.2 molar $LiPF_6$ or $LiAsF_6$ in propylene carbonate/dimethoxyethane. A lithium ion cell is also contemplated. Such secondary cells are built with a carbonaceous anode and a lithiated cathode active material, such as $LiCoO_2$.

Thus, various embodiments of electrical energy storage devices have been described. Each includes at least one drawn casing portion comprising a surrounding sidewall closed by a cover having a relatively flat or planar plate-shaped profile. This makes them particularly well suited for seating against a planar support, such as against a sidewall of an implantable medical device, for example, a cardiac defibrillator, cardiac pacemaker, neurostimulator or a drug pump, among others. Packaging efficiency is particularly important in an implantable medical device where "real estate" is at a premium.

It is appreciated that various modifications to the inventive concepts described herein may be apparent to those of ordinary skill in the art without departing from the spirit and scope of the present invention as defined by the appended claims.

What is claimed is:

1. An electrical energy storage device, which comprises:
  a) an enclosure comprising a casing portion comprising a casing face wall supporting a surrounding sidewall extending to a first peripheral edge, and a cover comprising a cover outer surface spaced from a cover inner face wall by a second peripheral edge, wherein the casing portion is closed by the cover with the first peripheral edge secured to the second peripheral edge;
  b) a first active material in electrical contact with at least one of the casing face wall and the cover inner face wall;
  c) a second active material as a shaped body of an opposite polarity as the first active material, wherein the shaped body comprises spaced apart first and second body face walls joined by an intermediate body end wall and wherein a first portion of the body end wall adjacent to the casing face wall is substantially normal to a plane of the first body face wall with a second portion of the body end wall meeting the second body face wall being inwardly contoured adjacent to where the first peripheral edge of the casing portion is secured to the second peripheral edge of the cover;
  d) a separator intermediate the first and second active materials;
  e) a glass-to-metal seal supported in at least one of the casing portion and the cover to electrically insulate a lead for the second active material from the enclosure serving as a terminal for the first active material; and
  f) a working electrolyte provided in the enclosure in contact with the first and second active materials.

2. The electrical energy storage device of claim 1 wherein the first body face wall is of a greater area than the second body face wall.

3. The electrical energy storage device of claim 1 wherein the first portion of the body end wall extends from the first body face wall past a plane bisecting the width of the end wall between the first and second body face walls.

4. The electrical energy storage device of claim 1 wherein the first active material is a cathode active material contacted to the casing face wall and the cover inner wall by either a pad printing process or as an ultrasonically deposited spray.

5. The electrical energy storage device of claim 1 wherein either a polymeric cradle or a plurality of polymeric restraints support between the surrounding sidewall of the casing portion and the body end wall to prevent movement of the body of the second active material inside the enclosure.

6. The electrical energy storage device of claim 1 wherein the casing portion is welded to the cover at the respective first and second peripheral edges to provide the enclosure.

7. The electrical energy storage device of claim 1 wherein the first active material is a cathode active material selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, cobalt, and mixtures thereof and the second active material is an anode selected from the group consisting of tantalum, aluminum, titanium, niobium, zirconium, hafnium, tungsten, molybdenum, vanadium, silicon, germanium, and mixtures thereof.

8. The electrical energy storage device of claim 1 as either a capacitor or an electrochemical cell.

9. An electrical energy storage device, which comprises:
  a) an enclosure comprising a casing portion comprising a casing face wall supporting a surrounding sidewall extending to a first peripheral edge, and a cover comprising a cover outer surface spaced from a cover inner face wall by a second peripheral edge, wherein the casing portion is closed by the cover with the first peripheral edge secured to the second peripheral edge;
  b) a cathode of a cathode active material in electrical contact with at least one of the casing face wall and the cover inner face wall;
  c) an anode as a shaped body of anode active material, wherein the anode body comprises spaced apart first and second anode face walls joined by an intermediate anode end wall and wherein a first portion of the anode end wall adjacent to the casing face wall is substantially normal to a plane of the first anode face wall with a second portion of the anode end wall meeting the second anode face wall being inwardly contoured adjacent to where the first peripheral edge of the casing portion is secured to the second peripheral edge of the cover;
  d) a separator intermediate the anode and cathode;
  e) a glass-to-metal seal supported in at least one of the casing portion and the cover to electrically insulate a lead for the anode from the enclosure serving as a terminal for the cathode; and
  f) a working electrolyte provided in the enclosure in contact with the anode and cathode.

10. The electrical energy storage device of claim 9 wherein the cover outer surface is planar.

11. The electrical energy storage device of claim 9 wherein the second portion of the anode end wall is planar and meets the second anode face wall at an obtuse angle.

12. The electrical energy storage device of claim 9 wherein the second portion of the anode end wall is substantially planar where it meets the first portion of the anode end wall and curved where it meets the second anode face wall.

13. The electrical energy storage device of claim 9 wherein the second portion of the anode end wall is concave.

14. The electrical energy storage device of claim 9 wherein the second portion of the anode end wall has an inwardly extending step shape.

15. The electrical energy storage device of claim 9 wherein there is an O-ring provided between the inwardly extending contour of the second portion of the anode end wall and where the first peripheral edge of the casing portion is secured to the second peripheral edge of the cover.

16. The electrical energy storage device of claim 15 wherein the O-ring is of a polymeric material having a cross-section selected from the group consisting of circular, rectangular, and square.

17. The electrical energy storage device of claim 15 wherein the polymeric material is selected from the group consisting of a polyimide, a silicone, PTFE, TFE, and polytrifluoroethylene.

18. The electrical energy storage device of claim 9 wherein the second peripheral edge of the cover extends beyond an outer surface of the surrounding sidewall of the casing portion.

19. The electrical energy storage device of claim 9 wherein the surrounding sidewall of the casing portion adjacent to the first peripheral edge is an outwardly turned lip having the first peripheral edge being coplanar with the second peripheral edge of the cover.

20. The electrical energy storage device of claim 9 wherein the second peripheral edge of the cover fits into the step at the first peripheral edge of the casing portion sidewall.

21. The electrical energy storage device of claim 9 wherein the casing enclosure is symmetrical along a bisecting plane.

22. An electrical energy storage device, which comprises:
   a) an enclosure comprising a casing portion comprising a surrounding sidewall extending to a first peripheral edge, and a cover comprising a cover outer surface spaced from a cover inner face wall by a second peripheral edge, wherein the casing portion is closed by the cover with the first peripheral edge secured to the second peripheral edge;
   b) a cathode of a cathode active material in electrical contact with at least one of the casing face wall and the cover inner face wall;
   c) an anode as a shaped body of anode active material, wherein the anode body comprises a cylindrically shaped sidewall extending between opposed end walls and wherein a portion of the anode sidewall is inwardly contoured adjacent to where the first peripheral edge of the casing portion is secured to the second peripheral edge of the cover;
   d) a separator intermediate the anode and cathode;
   e) a glass-to-metal seal supported in at least one of the casing portion and the cover to electrically insulate a lead for the anode from the enclosure serving as a terminal for the cathode; and
   f) a working electrolyte provided in the enclosure in contact with the anode and cathode.

23. The electrical energy storage device of claim 22 wherein the casing is symmetrical about a longitudinal axis.

24. A method for providing an electrical energy storage device, comprising the steps of:
   a) providing casing portion comprising a casing face wall supporting a surrounding sidewall extending to a first peripheral edge, and a cover comprising a cover outer surface spaced from a cover inner face wall by a second peripheral edge;
   b) electrically contacting a cathode active material to at least one of the casing face wall and the cover inner face wall to provide a cathode;
   c) providing a shaped body of anode active material comprising spaced apart first and second anode face walls joined by an intermediate anode end wall;
   d) enveloping the anode in a separator;
   e) nesting the separator enveloped anode in the casing portion with the first anode face wall positioned adjacent to the casing face wall and with a glass-to-metal seal connected to a lead for the anode being supported in the surrounding sidewall of the casing portion to electrically insulate the lead there from;
   f) closing the casing portion with its second peripheral edge being secured to the first peripheral edge of the casing portion to thereby enclose the anode and cathode therein, and providing a first portion of the anode end wall adjacent to the casing face wall being substantially normal to a plane of the first anode face wall with a second portion of the anode end wall meeting the second anode face wall being inwardly contoured adjacent to where the first peripheral edge of the casing portion is secured to the second peripheral edge of the cover; and
   g) providing a working electrolyte in the enclosure in contact with the anode and the cathode.

* * * * *